Patented June 12, 1923.

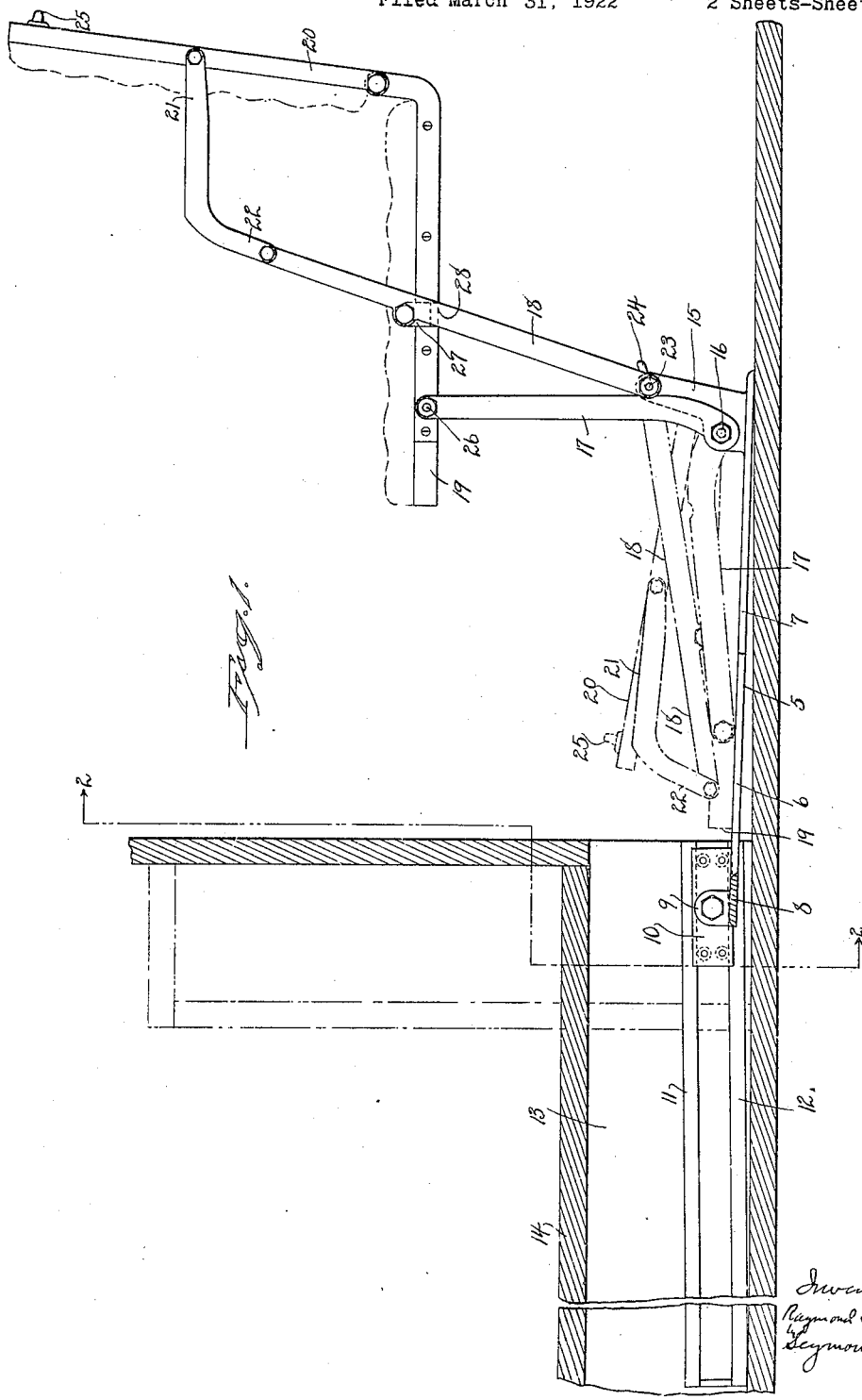

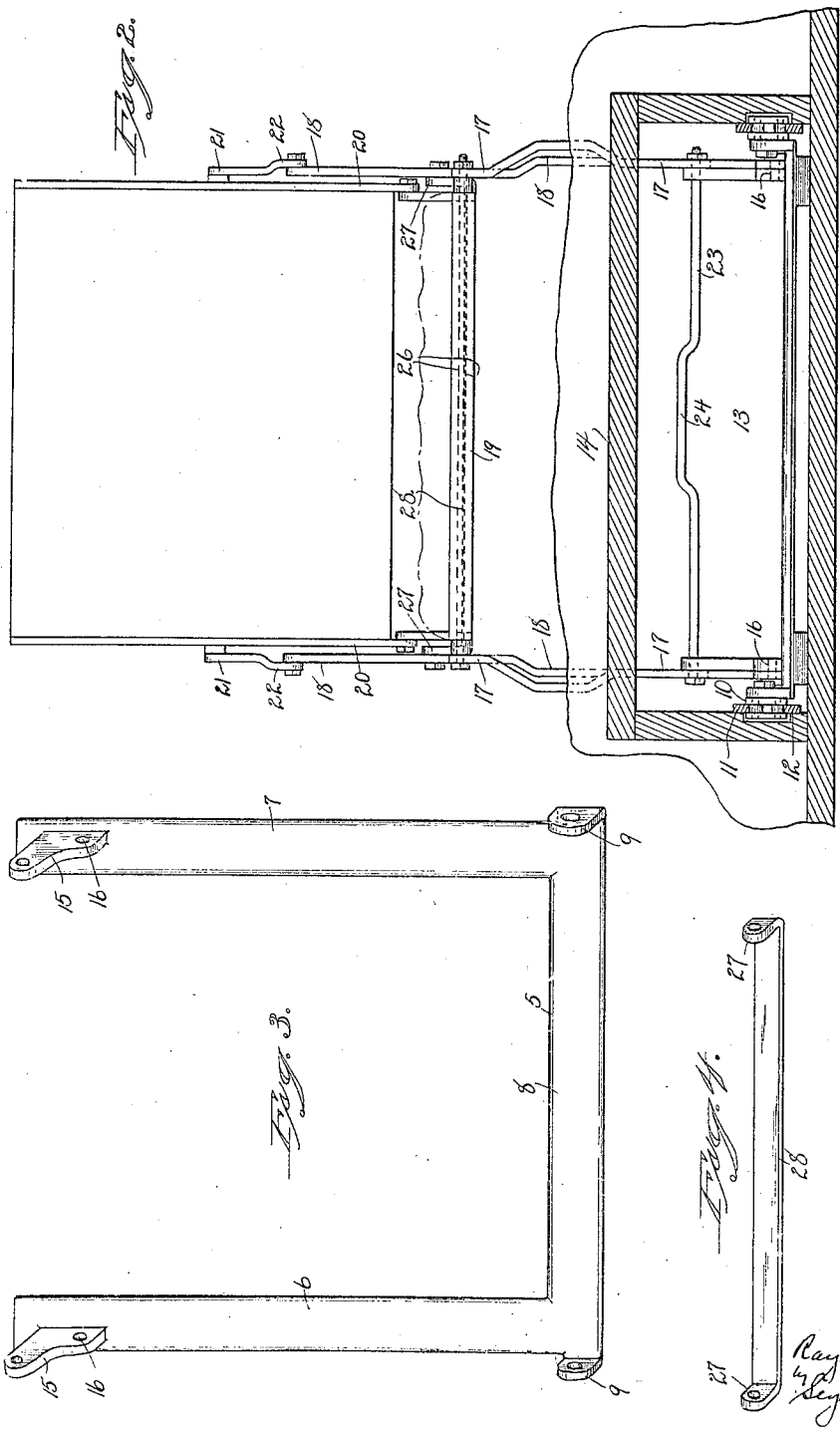

1,458,628

UNITED STATES PATENT OFFICE.

RAYMOND F. PARDY, OF BRIDGEPORT, CONNECTICUT.

AUXILIARY SEAT FOR AUTOMOBILES.

Application filed March 31, 1922. Serial No. 548,461.

*To all whom it may concern:*

Be it known that I, RAYMOND F. PARDY, a citizen of the United States, residing at Bridgeport, in the county of Fairfield and State of Connecticut, have invented a new and useful Improvement in Auxiliary Seats for Automobiles; and I do hereby declare the following, when taken in connection with the accompanying drawings, and the characters of reference marked thereon, to be a full, clear, and exact description of the same, and which said drawings constitute part of this application, and represent in—

Fig. 1 a side view, partly in section, showing my improved seat in its raised or open position, and indicated in broken lines in its closed position.

Fig. 2 a sectional view on the line 2—2 of Fig. 1, looking rearward.

Fig. 3 a perspective view of the slide, detached.

Fig. 4 a perspective view of the seat-yoke detached.

This invention relates to improvement in auxiliary seats for automobiles, and more especially to auxiliary seats which are housed beneath the front or driver's seat of automobiles.

The object of this invention is to provide a simple construction which folds into small compass, so as to occupy but small space beneath the driver's seat, which may be opened into position by a single operation, and which will not necessitate the cutting of the carpet on the floor of the car, and the invention consists in the construction as hereinafter described and particularly recited in the claims.

In carrying out my invention, I employ a base frame 5 having parallel sides 6 and 7, and a forward end 8. Preferably, the upper faces of the sides 6 and 7 will be rounded. The forward end is provided on opposite sides with lugs 9, by which it is pivotally connected with anti-friction slides 10 arranged to travel between the guides 11 and 12 arranged in a pocket 13 beneath the front or driver's seat 14. At the rear end of the sides 6 and 7 are upwardly-projecting brackets 15, and pivoted to these brackets, through holes 16, are what I will refer to as forward legs 17, and pivoted to the upper ends of the brackets are what I will refer to as rear legs 18. The rear edges of the front legs bear against the front edges of the rear legs which form stops to limit the rearward movement of the front legs beyond a substantially vertical position. The front legs are pivotally connected with the seat 19 and the rear legs are pivoted to the seat at a point in rear of the front legs and extend above the seat. Pivotally connected with the rear of the seat is a back 20, and to this back are pivoted arms 21, the forward ends 22 of which extend downward into pivotal engagement with the upper ends of the rear legs 18.

Preferably, the means for pivoting the rear legs to the brackets will be in the form of a long bolt or rod 23, the central portion 24 of which is offset to form a handle, by which the seat may be readily drawn out of the pocket, and, preferably, the back 20 will be provided with a suitable handle or grip 25, by which the seat may be lifted to its raised or open position.

Preferably, the upper ends of the front legs will be connected with the seat by a bolt 26, which extends across the seat, and, preferably, the rear legs will be pivoted to ears 27 formed at the ends of a yoke 28, which is secured to the under side of the seat.

The seat, back and arms may be upholstered in any desired style.

In Fig. 1 of the drawings, the seat is shown in full lines in its raised or lifted position, and to retire the seat, it is only necessary to press the top of the back forward to cause the parts to fold as indicated in broken lines in Fig. 1, so as to be in position to be moved forward into the pocket 13, and to open the seat it is only necessary to reverse this operation, that is, draw the slide outward and then, by lifting with the handle 25, the seat is brought to its raised and open position. It will be noted that in folding, the seat itself does not turn, but always remains with its cushion uppermost. When in its retired position, the seat is entirely housed and forms no obstruction to the car, and when drawn outward, does not require that the carpet be disturbed, as it will ride over the carpet and rest thereon. The manner of pivoting the seat provides for upholstering without difficulty.

It is obvious, without further illustration, that if desired and in some forms of cars, instead of sliding the folded seat forward into the pocket, the folded seat with the frame may be turned into a vertical position against the back of the front seat, or into a vertical chamber formed therein.

It is further obvious that the arms may be omitted and the upper ends of the rear legs terminate at the sides of the seat.

I claim:

1. An auxiliary seat for automobiles, comprising a base frame formed at its rear with upwardly-projecting brackets, front legs pivoted to said brackets near said base, rear legs independently connected with said brackets at points above and in rear of said front legs, a seat with which said legs are pivotally connected, and means to limit the rearward movement of the legs.

2. An auxiliary seat for automobiles, comprising a base frame, front and back legs independently pivotally connected with the rear of the frame, a seat with which said legs are pivotally connected, the rear legs extending above the said seat, a back pivotally connected with the said seat, and arms pivotally connected with the back and with the upper ends of the rear legs.

3. An auxiliary seat for automobiles, comprising a base frame, slides with which the forward end of the frame is connected, guides for said slides, said frame formed at its rear end with brackets near said base, front legs pivoted to said brackets, rear legs pivoted to said brackets above and in rear of the front legs and independent of the front legs, a seat pivotally connected with said legs above which the rear legs extend, a back pivotally connected with the rear of the said seat, and arms pivotally connected with the said back and with the upper ends of the rear legs.

4. An auxiliary seat for automobiles, comprising a base frame formed at its rear end with upwardly-projecting brackets, front legs pivoted to said brackets near said base, rear legs independently connected with said brackets at a point above and in rear of said front legs by a transversely-arranged bolt formed between its ends with an offset, a seat pivotally connected with said legs, the rear legs extending above said seat, a back pivotally connected with said seat, and arms pivotally connected with the said back and the upper ends of the said rear legs.

In testimony whereof, I have signed this specification in the presence of two subscribing witnesses.

RAYMOND F. PARDY.

Witnesses:
 ROY F. PARDY,
 FREDERIC C. EARLE.